United States Patent
Sugiyama

[11] 4,025,168
[45] May 24, 1977

[54] WIDE ANGLE PHOTOGRAPHIC LENS

[75] Inventor: Takahiro Sugiyama, Tokyo, Japan

[73] Assignee: Asahi Kogaku Kogyo Kabushiki Kaisha, Tokyo, Japan

[22] Filed: Dec. 22, 1975

[21] Appl. No.: 642,824

[30] Foreign Application Priority Data

Dec. 20, 1974  Japan ............................. 49-146955

[52] U.S. Cl. .............................. 350/196; 350/176; 350/207; 350/214
[51] Int. Cl.² ....................... G02B 5/22; G02B 9/64
[58] Field of Search ........... 350/176, 214, 207, 196

[56]          References Cited
         UNITED STATES PATENTS

| | | | |
|---|---|---|---|
| 3,870,400 | 3/1975 | Yamashita et al. | 350/214 |
| 3,884,556 | 5/1975 | Nakagawa | 350/214 |
| 3,924,935 | 12/1975 | Takahashi et al. | 350/214 |
| 3,942,875 | 3/1976 | Betensky | 350/214 |

Primary Examiner—Paul A. Sacher
Attorney, Agent, or Firm—Sughrue, Rothwell, Mion, Zinn & Macpeak

[57]          ABSTRACT

A small size wide angle lens having an aperture ratio of 1 : 1.4 is disclosed. The lens consists of seven lens groups arranged to achieve the objects of brightness, small size, large aperture opening, while balancing the aberration.

4 Claims, 20 Drawing Figures

WIDE ANGLE PHOTOGRAPHIC LENS

SUMMARY OF THE INVENTION

This invention is a wide angle photographic lens having an aperture ratio of 1 : 1.4 and a large angular field between 75° and 84°. The invention successfully maintains a sufficient back focal length, provides correction of various types of aberrations despite the extreme brightness of the lens having an aperture ratio of 1 : 1.4, and is relatively small in size.

DETAILED DESCRIPTION OF THE INVENTION

Figure 1:
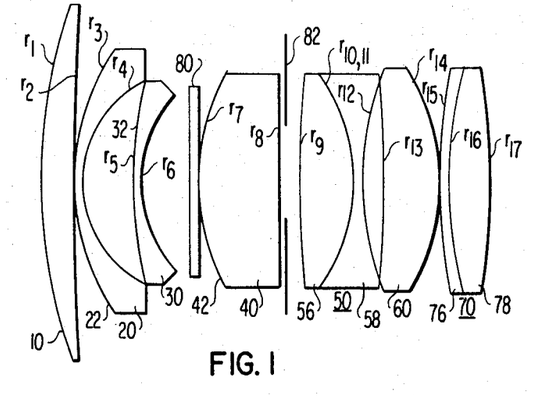
FIG. 1 illustrates a lens according to the present invention constructed according to a first example.
Figure 2A:
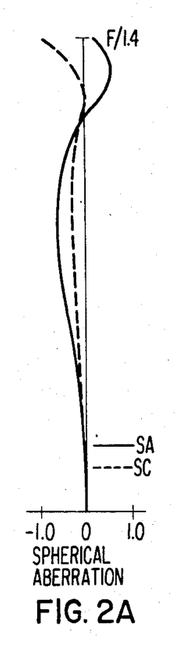
FIGS. 2A, 2B, 2C and 2D illustrate aberration curves for the lens according to the first example.
Figure 2B:
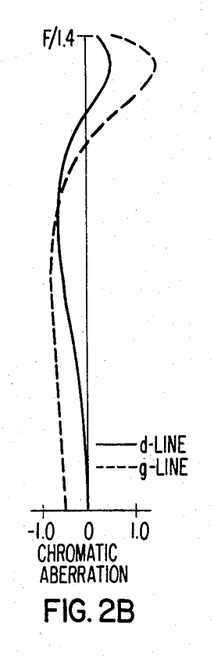
Figure 2C:
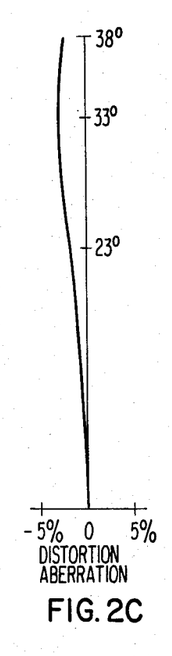
Figure 2D:
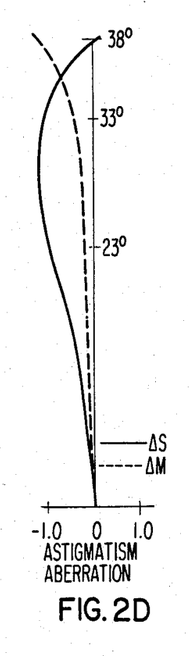
Figure 3:
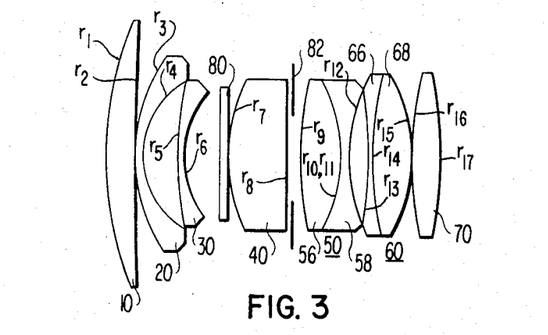
FIG. 3 illustrates a lens according to the present invention constructed according to a second example.
Figure 4A:
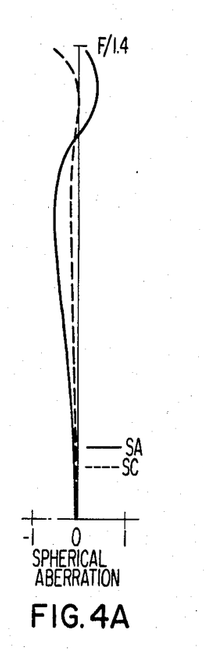
FIGS. 4A, 4B, 4C and 4D illustrate aberration curves for a lens according to the second example.
Figure 4B:
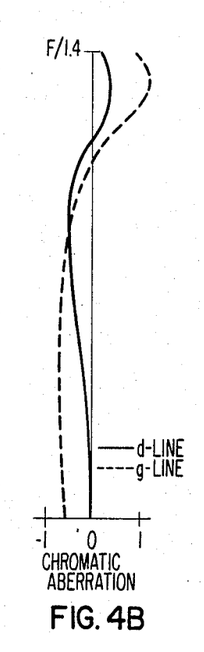
Figure 4C:
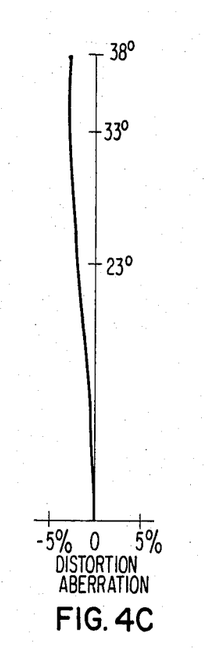
Figure 4D:
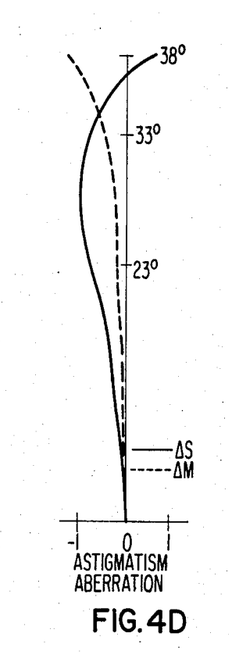
Figure 5:
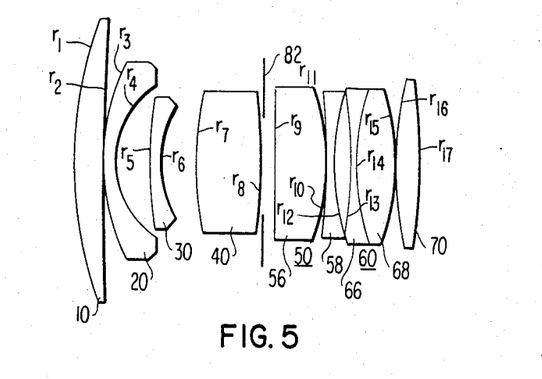
FIG. 5 illustrates a lens according to the present invention constructed according to a third example.
Figure 6A:
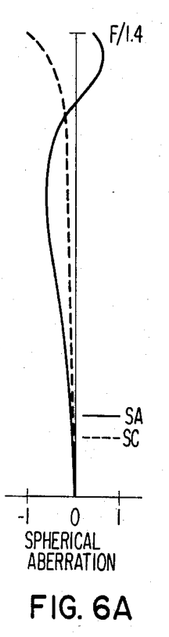
FIGS. 6A, 6B, 6C and 6D illustrate aberration curves for a lens according to a third example.
Figure 6B:
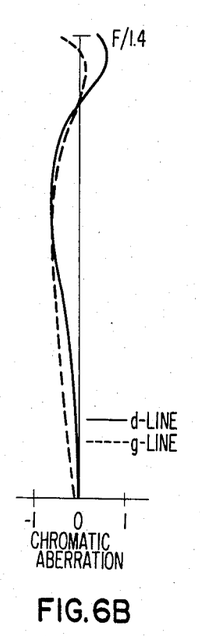
Figure 6C:
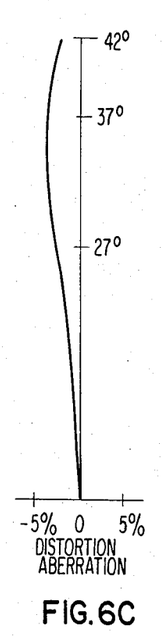
Figure 6D:
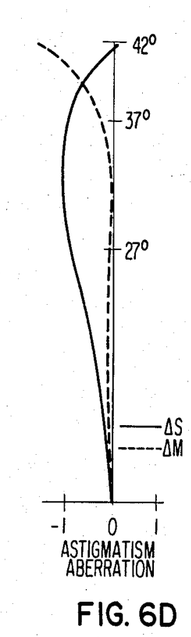
Figure 7:
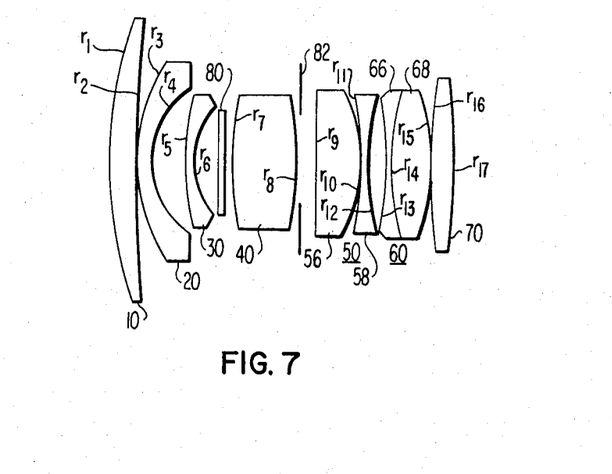
FIG. 7 illustrates a lens according to the invention constructed according to a fourth example.
Figure 8A:
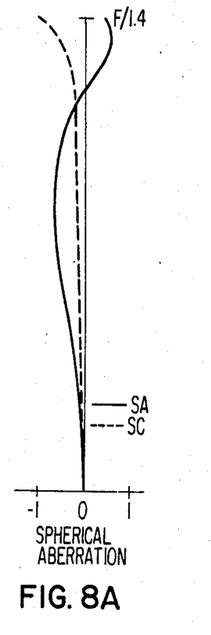
FIGS. 8A, 8B, 8C, and 8D illustrate aberration curves for a lens according to the fourth example.
Figure 8B:
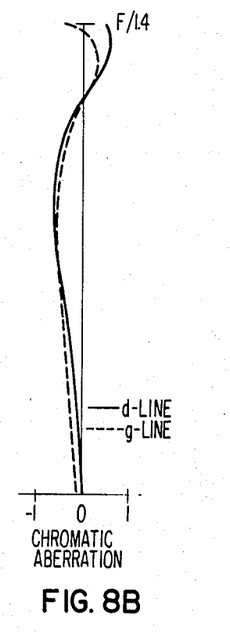
Figure 8C:
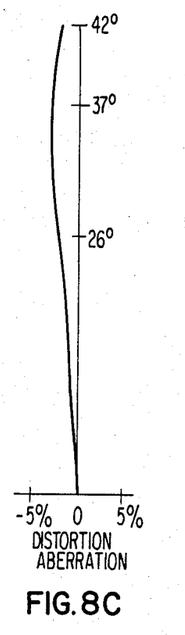
Figure 8D:
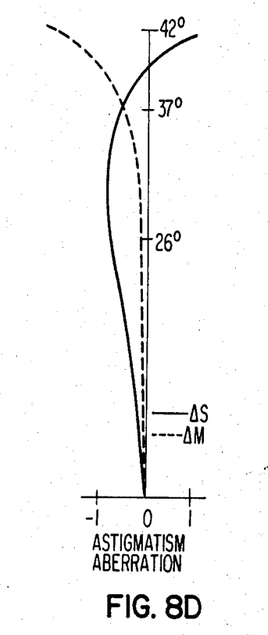

According to the present invention as shown in the four embodiments of FIGS. 1, 3, 5 and 7, there is provided a lens system comprising a first positive lens 10, a second negative meniscus lens 20 with its convex surface 22 directed toward an object, a third negative meniscus lens 30 with its convex surface 32 directed toward an object, a fourth positive lens 40, a fifth negative lens 50 in the form of a compound lens comprising positive and negative lenses 56 and 58, respectively, joined as shown in FIGS. 1 and 3, or divided, as shown in FIGS. 5 and 7, a sixth positive lens 60 in the form of a single lens as shown in FIG. 1, or composed by joining positive and negative lenses 68 and 66 as shown in FIGS. 3, 5 and 7, and a seventh positive lens 70 in the form of a single lens, as shown in FIGS. 3, 5 and 7, or composed by joining positive and negative lenses 78 and 76 as shown in FIG. 1, a filter 80 being interposed between said third and fourth lenses, said filter being not counted among the number of lenses, and a diaphragm 82 being interposed between said fourth and said fifth lenses.

Since the seven lenses previously described include lenses which are actually composed of two lens elements, the seven lenses will occasionally be referred to herein as a lens group; it being understood that "group" is broad enough to include one or more lens elements. The wide angle photographic lens of the invention meets the following conditions:

$$\nu_1 > 50, \nu_2 > 50, \nu_3 > 50 \quad (I)$$

$$F/0.6 > |F_{1\cdot 2\cdot 3}| > F/1.2 \; F_{1\cdot 2\cdot 3} < 0 \quad (II)$$

$$\Sigma d/1.5 > D > \Sigma d/4.0 \quad (III)$$

$$F/0.2 > |F_{1\cdot 2\cdot 3\cdot 4\cdot 5}| > F/1.1 \; F_{1\cdot 2\cdot 3\cdot 4\cdot 5} < 0 \quad (IV)$$

$$18 < (\nu_+ - \nu_-) < 27 \quad (V)$$

where $F$: the resultant focal length of the entire system, $F_{1\cdot 2\ldots i}$: the resultant focal length to the $i$ group, $r_j$: the radius of curvature of the $j$ surface, with the surfaces being numbered consecutively from the one nearest the object side, $d_j$: the thickness or air gap between the $j$ and $j+l$ surfaces, $N_k$: the refractive index of the $k$ lens, $\nu_k$: the Abbe's number of the $k$ lens, $\Sigma_d$: the overall length of the lens system, $D$: the length from the first surface of the fourth group to the final surface of the fifth group, $\nu_+$: the average of values $\nu$ of the positive lenses within the sixth and seventh groups, $\nu_-$: the average of values $\nu$ of the negative lenses within the above groups.

In the following, the above-mentioned conditions will be described.

Condition (I): $\nu_1 > 50, \nu_2 > 50, \nu_3 > 50$

In a wide angle photographic lens, the larger the angular field or the higher the brightness, the greater the chromatic aberration of the multiplying factor in the peripheral portion of the image plane. To prevent this, condition (I) is provided. The difference of chromatic aberrations of the multiplying factor between the midportion and the peripheral portion of the image plane tends to occur in the first, second and third lenses, which have large incident angles. If $\nu_1$, $\nu_2$, and $\nu_3$ are smaller than 50, the excessive chromatic aberration tends to remain. In order to compensate, an excessive converging system is provided after the fourth lens. However this adversely affects other various aberrations, and hence, the efficiency may not be improved only by correction of the chromatic aberration of the multiplying factor.

Condition (II): $F/0.6 > |F_{1\cdot 2\cdot 3}| > F/1.2; F_{1\cdot 2\cdot 3} < 0$ The relationship of $F_{1\cdot 2\cdot 3} < 0$ is provided to obtain the back focal length required for attaching the lens to a camera and simultaneously to permit the lens system to have a small size. If $F_{1\cdot 2\cdot 3}$ is greater than the upper limit $F/0.6$, it is necessary, in order to obtain the necessary back focal length, to reduce the focal length of emission systems after the fourth group or to increase the thickness or spacing of the lens. If the focal length is reduced (the former), the balance of aberration, particularly, the coma aberration tends to worsen, whereas if the thickness or spacing is increased (the latter), the overall length of lens is increased and when an attempt is made to obtain the same quantity of peripheral light, the front lens or rear lens must be designed to have a greater diameter thereof, resulting in a greater lens system, which will not satisfy the object of miniaturization. On the other hand, if $|F_{1\cdot 2\cdot 3}|$ is smaller than the lower limit $F/1.2$, the back focal length as required may readily be obtained. However, this results in a shorter focal length of converging systems after the fourth group, thereby leading to a worsening of the coma aberration, which is not desirable.

Condition (III): $\Sigma d/1.5 > D > \Sigma d/4.0$

This condition is provided to maintain the balance of aberration, particularly, the balance of the coma aberration. This condition is important to maintain the balance of action of light flux incident upon the fourth group to a beam of light above the diaphragm and of action of light flux emitted from the fifth group to a beam of light below the diaphragm. Where the length is less than the lower limit $\Sigma d/4.0$, and assuming that the resultant focal length of the fourth group is the same as that of the fifth group, the light above the diaphragm and the light below the diaphragm may be balanced by the provision of the approximately same height of light incident upon the fourth group as that of light emitted from the fifth group. In this case, however, the height of incident light and the height of emitted light become lowered so that the radius of curvature $r_7$ and $r_{12}$ must further be reduced in order to enhance the action to respective light, thus leading to the cause of increasing not only the coma but increasing the spherical aberration and distortion aberration. On the other hand, where the length is greater than the upper limit $\Sigma d/1.5$, action of light passing above the diaphragm and of light passing below the diaphragm by means of the fourth and fifth groups is enhanced to readily maintain the balance of various aberrations, while the overall length of lens system becomes longer, which will not go along with the object for miniaturization.

Condition (IV) $F/0.2 > |F_{1\cdot 2\cdot 3\cdot 4\cdot 5}| > F/1.1$  $F_{1\cdot 2\cdot 3\cdot 4\cdot 5} < 0$ This condition is provided to obtain the back focal length as required and to obtain a better correction of coma. Where it is greater than the upper limit $F/0.2$, and in order to obtain the back focal length as required by designing lenses having the same resultant focal distance, it is required to provide a greater focal distance of the converging system in the sixth group to reduce the focal distance of the converging system in the seventh group or to provide a greater spacing or thickness of lens after the fifth group. However, in the former, it will be difficult to properly correct the spherical aberration and in addition will lead to the cause of worsening the coma. In the latter, on the other hand, the overall length of lenses becomes longer, which is not desirable. Where the value is smaller than the lower limit $F/1.1$, the back focal length may readily be obtained as required, but the focal length of the converging system after the sixth group becomes shorter, resulting in an increase in spherical aberration and in addition an increase in coma.

Condition (V) $18 < (\nu_+ - \nu_-) < 27$

In a bright lens system having an aperture ratio of 1 : 1.4, it is desirable for maintenance of better spherical aberration in the long back focal length to attenuate the radius of curvature at the positive refractive surface in the second half group. Therefore, it is necessary to use positive lenses made of potassium nitrate, which is relatively high in refractive index. It is further necessary to properly correct chromatic aberration within the range such that a degree of negative lenses will not become excessively strong. Thus, the condition (V) represents the difference of the value $\nu$ therefor. That is, if the value $(\nu_+ - \nu_-)$ is greater than 27, excessive potassium nitrate must be used so that the refractive index of the positive lens tends to be reduced, thus adversely affecting the above-mentioned object. On the other hand, if the afore-said value is smaller than 18, it will also be difficult to properly correct chromatic aberration with the above-mentioned object satisfied.

According to the specific feature of the invention, there is provided a wide angle photographic lens having an aperture ratio of 1 : 1.4 and a large angular field between 75° and 84°, which can maintain sufficient back focal length and properly correct various aberrations despite of the brightness of the lens, while maintaining the lens system in a miniaturized type.

Four specific examples of the invention are illustrated in FIGS. 1, 3, 5 and 7. The parameters for these examples are given in Examples 1, 2, 3 and 4 below. The distance values are all in millimeters. The aberration curves for the four specific examples are given in FIGS. 2, 4, 6 and 8, respectively.

Lens data in Examples 1, 2, 3 and 4 according to the present invention will be given below in numerical values with the resultant focal length F = 100 mm.

Example 1

Aperture ratio 1 : 1.4   Angular field 75°   F = 100

| Lens | Radius of Curvature r | Lens Thickness or Distance d | Refractive Index n | Abbe No. $\nu$ |
|---|---|---|---|---|
| 10 | $r_1 =$ 282.699 | $d_1 =$ 18.662 | $n_1 =$ 1.61800 | $\nu_1 =$ 63.4 |
|    | $r_2 =$ 1656.318 | $d_2 =$ 0.351 | | |
| 20 | $r_3 =$ 132.638 | $d_3 =$ 4.216 | $n_2 =$ 1.51633 | $\nu_2 =$ 64.1 |
|    | $r_4 =$ 58.362 | $d_4 =$ 28.285 | | |
| 30 | $r_5 =$ 223.254 | $d_5 =$ 4.239 | $n_3 =$ 1.51823 | $\nu_3 =$ 59.0 |
|    | $r_6 =$ 71.000 | $d_6 =$ 24.767 | | |
| filter | $\infty$ | 5.263 | 1.51633 | 64.1 |
|    | $\infty$ | 0.702 | | |
| 40 | $r_7 =$ 126.145 | $d_7 =$ 44.704 | $n_4 =$ 1.80518 | $\nu_4 =$ 25.4 |
|    | $r_8 =$ −5909.840 | $d_8 =$ 10.526 | | |
| 56 | $r_9 =$ 449.925 | $d_9 =$ 30.414 | $n_5 =$ 1.78590 | $\nu_5 =$ 44.1 |
|    | $r_{10} =$ −96.757 | $d_{10} =$ 0.000 | | |
| 58 | $r_{11} =$ −96.757 | $d_{11} =$ 5.649 | $n_6 =$ 1.84666 | $\nu_5 =$ 23.9 |
|    | $r_{12} =$ 155.464 | $d_{12} =$ 16.408 | | |
|    | $r_{13} =$ −367.339 | | | |

Example 1-continued

Aperture ratio 1 : 1.4 Angular field 75° F = 100

| Lens | Radius of Curvature r | Lens Thickness or Distance d | Refractive Index n | Abbe No. $\nu$ |
|---|---|---|---|---|
| 60 | | $d_{13} = 30.418$ | $n_7 = 1.81600$ | $\nu_7 = 46.8$ |
| | $r_{14} = -103.609$ | $d_{14} = 0.565$ | | |
| 76 | $r_{15} = 263.621$ | $d_{15} = 4.211$ | $n_8 = 1.84666$ | $\nu_8 = 23.9$ |
| | $r_{16} = 158.143$ | $d_{16} = 18.993$ | $n_9 = 1.77250$ | $\nu_9 = 49.7$ |
| 78 | $r_{17} = -394.870$ | | | |

Back focal length = 133.512
$F_{1.2.3} = -124.223$  $F_{1.2.3.4.5} = -201.857$
$\Sigma d = 248.373$  $D = 91.293$
Sum of Petzval = 0.184
All distances are in millimeters.

Example 2

Aperture 1 : 1.4 Angular field 75° F = 100

| Lens | Radius of Curvature r | Lens Thickness or Distance d | Refractive Index n | Abbe No. $\nu$ |
|---|---|---|---|---|
| 10 | $r_1 = 289.392$ | $d_1 = 19.538$ | $n_1 = 1.61800$ | $\nu_1 = 63.4$ |
| | $r_2 = 1571.489$ | $d_2 = 0.351$ | | |
| 20 | $r_3 = 124.137$ | $d_3 = 4.209$ | $n_2 = 1.51633$ | $\nu_2 = 64.1$ |
| | $r_4 = 58.580$ | $d_4 = 27.466$ | | |
| 30 | $r_5 = 227.680$ | $d_5 = 3.823$ | $n_3 = 1.51823$ | $\nu_3 = 59.0$ |
| | $r_6 = 72.324$ | $d_6 = 28.027$ | | |
| filter | $\infty$ | 5.262 | 1.51633 | 64.1 |
| | $\infty$ | 0.702 | | |
| 40 | $r_7 = 131.430$ | $d_7 = 45.636$ | $n_4 = 1.80518$ | $\nu_4 = 25.4$ |
| | $r_8 = -2280.062$ | $d_8 = 10.523$ | | |
| 56 | $r_9 = 449.881$ | $d_9 = 30.518$ | $n_5 = 1.78590$ | $\nu_5 = 44.1$ |
| | $r_{10} = -118.956$ | $d_{10} = 0.000$ | | |
| 58 | $r_{11} = -118.956$ | $d_{11} = 5.648$ | $n_6 = 1.80518$ | $\nu_6 = 25.4$ |
| | $r_{12} = 145.380$ | $d_{12} = 14.663$ | | |
| 66 | $r_{13} = -285.050$ | $d_{13} = 4.209$ | $n_7 = 1.80518$ | $\nu_7 = 25.4$ |
| | $r_{14} = 209.766$ | | | |
| 68 | $r_{14} = 209.766$ | $d_{14} = 29.606$ | $n_8 = 1.77250$ | $\nu_8 = 49.7$ |
| | $r_{15} = -105.195$ | $d_{15} = 0.351$ | | |
| 70 | $r_{16} = 267.581$ | $d_{16} = 21.608$ | $n_9 = 1.83481$ | $\nu_9 = 42.8$ |
| | $r_{17} = -370.142$ | | | |

Back focal length = 133.794
$F_{1.2.3} = -130.240$  $F_{1.2.3.4.5} = -244.404$
$\Sigma d = 252.140$  $D = 92.325$
Sum of Petzval = 0.170
All distances are in millimeters.

Example 3

Aperture 10 ratio 1 : 1.4 Angular field 84° F = 100

| Lens | Radius of Curvature r | Lens Thickness or Distance d | Refractive Index n | Abbe No. $\nu$ |
|---|---|---|---|---|
| 10 | $r_1 = 280.171$ | $d_1 = 26.408$ | $n_1 = 1.51874$ | $\nu_1 = 64.5$ |
| | $r_2 = 1566.384$ | $d_2 = 0.408$ | | |
| 20 | $r_3 = 146.351$ | $d_3 = 9.184$ | $n_2 = 1.56873$ | $\nu_2 = 63.1$ |
| | $r_4 = 61.974$ | $d_4 = 30.776$ | | |
| 30 | $r_5 = 210.804$ | $d_5 = 7.388$ | $n_3 = 1.54041$ | $\nu_3 = 51.0$ |
| | $r_6 = 72.030$ | $d_6 = 54.245$ | | |

Example 3-continued

Aperture 10 ratio 1 : 1.4 Angular field 84° F = 100

| Lens | Radius of Curvature r | Lens Thickness or Distance d | Refractive Index n | Abbe No. $\nu$ |
|---|---|---|---|---|
| 40 | $r_7 = 209.388$ | $d_7 = 57.102$ | $n_4 = 1.80518$ | $\nu_4 = 25.4$ |
|    | $r_8 = -538.870$ | $d_8 = 13.225$ | | |
| 56 | $r_9 = 2040.815$ | $d_9 = 45.347$ | $n_5 = 1.78590$ | $\nu_5 = 44.1$ |
|    | $r_{10} = -159.042$ | $d_{10} = 0.694$ | | |
| 58 | $r_{11} = -653.061$ | $d_{11} = 7.918$ | $n_6 = 1.84666$ | $\nu_6 = 23.9$ |
|    | $r_{12} = 170.403$ | $d_{12} = 14.245$ | | |
| 66 | $r_{13} = -648.583$ | $d_{13} = 3.796$ | $n_7 = 1.84666$ | $\nu_7 = 23.9$ |
|    | $r_{14} = 159.277$ | | | |
| 68 | | $d_{14} = 37.061$ | $n_8 = 1.77250$ | $\nu_8 = 49.7$ |
|    | $r_{15} = -157.998$ | $d_{15} = 0.408$ | | |
| 70 | $r_{16} = 304.632$ | $d_{16} = 20.939$ | $n_9 = 1.83481$ | $\nu_9 = 42.8$ |
|    | $r_{17} = -432.117$ | | | |

Back focal length = 151.051
$F_{1,2,3} = -118.329$  $F_{1,2,3,4,5} = -409.165$
$\Sigma d = 309.144$  D = 124.286
Sum of Petzval = 0.143
All distances are in millimeters.

Example 4

Aperture ratio 1 : 1.4 Angular field 84° F = 100

| Lens | Radius of Curvature r | Lens Thickness or Distance d | Refractive Index n | Abbe No. $\nu$ |
|---|---|---|---|---|
| 10 | $r_1 = 277.551$ | $d_1 = 27.225$ | $n_1 = 1.50378$ | $\nu_1 = 66.8$ |
|    | $r_2 = 1639.988$ | $d_2 = 0.408$ | | |
| 20 | $r_3 = 134.694$ | $d_3 = 9.225$ | $n_2 = 1.56873$ | $\nu_2 = 63.1$ |
|    | $r_4 = 63.474$ | $d_4 = 31.592$ | | |
| 30 | $r_5 = 187.755$ | $d_5 = 7.388$ | $n_3 = 1.51823$ | $\nu_3 = 59.0$ |
|    | $r_6 = 65.483$ | $d_6 = 22.449$ | | |
| filter | $\infty$ | 4.898 | 1.51633 | 64.1 |
|        | $\infty$ | 6.531 | | |
| 40 | $r_7 = 246.939$ | $d_7 = 57.143$ | $n_4 = 1.80518$ | $\nu_4 = 25.4$ |
|    | $r_8 = -453.148$ | $d_8 = 16.327$ | | |
| 56 | $r_9 = 1755.101$ | $d_9 = 40.816$ | $n_5 = 1.78590$ | $\nu_5 = 44.1$ |
|    | $r_{10} = -131.478$ | $d_{10} = 0.408$ | | |
| 58 | $r_{11} = -246.939$ | $d_{11} = 7.878$ | $n_6 = 1.80518$ | $\nu_6 = 25.4$ |
|    | $r_{12} = 176.858$ | $d_{12} = 14.041$ | | |
| 66 | $r_{13} = -649.130$ | $d_{13} = 6.122$ | $n_7 = 1.80518$ | $\nu_7 = 25.4$ |
|    | $r_{14} = 163.265$ | | | |
| 68 | | $d_{14} = 34.694$ | $n_8 = 1.77250$ | $\nu_8 = 49.7$ |
|    | $r_{15} = -147.092$ | $d_{15} = 0.408$ | | |
| 70 | $r_{16} = 298.396$ | $d_{16} = 20.408$ | $n_9 = 1.83481$ | $\nu_9$ 42.8 |
|    | $r_{17} = -486.238$ | | | |

Back focal length = 150.855
$F_{1,2,3} = -124.595$  $F_{1,2,3,4,5} = -304.599$
$\Sigma d = 307.961$  D = 122.572
Sum of Petzval = 0.133
All distances are in millimeters.

What is claimed is:
1. A highly efficient wide angle photographic lens comprising seven lens groups positioned consecutively from the object to the image side of the lens system, said first group is a positive lens $L_1$, said second grou is a negative meniscus lens $L_2$ convex to the object, sa third group is a negative meniscus lens $L_3$ convex to tl object, said fourth group is a positive lens $L_4$, said fifth group is a negative lens in the form of a compound lens comprising positive and negative lens elements $L_5$ and $L_6$, respectively, said sixth group is a positive lens and said seventh group is a positive lens, and a diaphragm being interposed between said fourth group and said fifth group, wherein said fifth group comprises joined positive and negative lenses, said sixth group is a simple lens $L_7$, said seventh group is a positive lens constructed by joining a positive lens $L_8$ and a negative lens $L_9$, and further comprising a filter positioned between said third and said fourth groups, the elements of said wide angle lens having the following characteristics and dimensions:

Aperture ratio 1 : 1.4 Angular field 75° F = 100

| Lens | Radius of Curvature r | Lens Thickness or Distance d | Refractive Index n | Abbe No. ν |
|---|---|---|---|---|
| $L_1$ | $r_1=$ 282.699 | | | |
| | | $d_1=18.662$ | $n_1=1.61800$ | $ν_1=63.4$ |
| | $r_2=$ 1656.318 | | | |
| | | $d_2=0.351$ | | |
| $L_2$ | $r_3=$ 132.638 | | | |
| | | $d_3=4.216$ | $n_2=1.51633$ | $ν_2=64.1$ |
| | $r_4=$ 58.362 | | | |
| | | $d_4=28.285$ | | |
| $L_3$ | $r_5=$ 223.254 | | | |
| | | $d_5=4.239$ | $n_3=1.51823$ | $ν_3=59.0$ |
| | $r_6=$ 71.000 | | | |
| | | $d_6=24.767$ | | |
| filter | ∞ | | | |
| | | 5.263 | 1.51633 | 64.1 |
| | ∞ | | | |
| | | 0.702 | | |
| $L_4$ | $r_7=$ 126.145 | | | |
| | | $d_7=44.704$ | $n_4=1.80518$ | $ν_4=25.4$ |
| | $r_8=$ −5909.840 | | | |
| | | $d_8=10.526$ | | |
| $L_5$ | $r_9=$ 449.925 | | | |
| | | $d_9=30.414$ | $n_5=1.78590$ | $ν_5=44.1$ |
| | $r_{10}=$ −96.757 | | | |
| | | $d_{10}=0.000$ | | |
| $L_6$ | $r_{11}=$ −96.757 | | | |
| | | $d_{11}=5.649$ | $n_6=1.84666$ | $ν_6=23.9$ |
| | $r_{12}=$ 155.465 | | | |
| | | $d_{12}=16.408$ | | |
| $L_7$ | $r_{13}=$ −367.339 | | | |
| | | $d_{13}=30.418$ | $n_7=1.81600$ | $ν_7=46.8$ |
| | $r_{14}=$ −103.609 | | | |
| | | $d_{14}=0.565$ | | |
| $L_8$ | $r_{15}=$ 263.621 | | | |
| | | $d_{15}=4.211$ | $n_8=1.84666$ | $ν_8=23.9$ |
| | $r_{16}=$ 158.143 | | | |

-continued

Aperture ratio 1 : 1.4 Angular field 75° F = 100

| Lens | Radius of Curvature r | Lens Thickness or Distance d | Refractive Index n | Abbe No. ν |
|---|---|---|---|---|
| $L_9$ | $r_{17}=$ −394.870 | $d_{16}=18.993$ | $n_9=1.77250$ | $ν_9=49.7$ |

Back focal length = 133.512 $F_{1,2,3}=-124.223$
$F_{1,2,3,4,5}=-201.857$ $Σd=248.373$ $D=91.293$
Sum of Petzval = 0.184 all distances are in millimeters, where
$F$ : the resultant focal length of the entire system,
$F1.2 \ldots i$ : the resultant focal length of the $i$ group,
$r_j$ : the radius of curvature of the $j$ surface, with the surfaces being numbered consecutively from the one nearest the object side,
$d_j$ : the thickness of air gap between the $j$ and $j+1$ surfaces
$n_k$ : the refractive index of the $k$ lens,
$ν_k$ : the Abbe number of the $k$ lens,
$Σd$ : the overall length of the lens system,
$D$ : the length from the first surface of the fourth group to the final surface of the fifth group.

2. A highly efficient wide angle photographic lens comprising seven lens groups positioned consecutively from the object to the image side of the lens system, said first group is a positive lens $L_1$, said second group is a negative meniscus lens $L_2$ convex to the object, said third group is a negative meniscus lens $L_3$ convex to the object, said fourth group is a positive lens $L_4$, said fifth group is a negative lens in the form of a compound lens comprising positive and negative lens elements $L_5$ and $L_6$, respectively, said sixth group is a positive lens and said seventh group is a positive lens, and a diaphragm being interposed between said fourth group and said fifth group, wherein said fifth group is a compound lens consisting of a positive and a negative lens joined together, said sixth group is a compound lens consisting of a positive lens $L_7$ and a negative lens $L_8$ joined together, said seventh group is a simple lens $L_9$, and wherein a filter is positioned between said third and fourth groups, the elements of said wide angle lens having the following characteristics and dimensions:

Aperture ratio 1 : 1.4 Angular field 75° F = 100

| Lens | Radius of Curvature r | Lens Thickness or Distance d | Refractive Index n | Abbe No. ν |
|---|---|---|---|---|
| $L_1$ | $r_1=$ 289.392 | | | |
| | | $d_1=19.538$ | $n_1=1.61800$ | $ν_1=63.4$ |
| | $r_2=$ 1571.489 | | | |
| | | $d_2=0.351$ | | |
| $L_2$ | $r_3=$ 124.137 | | | |
| | | $d_3=4.209$ | $n_2=1.51633$ | $ν_2=64.1$ |
| | $r_4=$ 58.580 | | | |
| | | $d_4=27.466$ | | |
| $L_3$ | $r_5=$ 227.680 | | | |
| | | $d_5=3.823$ | $n_3=1.51823$ | $ν_3=59.0$ |
| | $r_6=$ 72.324 | | | |
| | | $d_6=28.027$ | | |
| filter | ∞ | | | |
| | | 5.262 | 1.51633 | 64.1 |
| | ∞ | | | |
| | | 0.702 | | |
| $L_4$ | $r_7=$ 131.430 | | | |
| | | $d_7=45.636$ | $n_4=1.80518$ | $ν_4=25.4$ |
| | $r_8=$ −2280.062 | | | |
| | | $d_8=10.523$ | | |
| $L_5$ | $r_9=$ 449.881 | | | |
| | | $d_9=30.518$ | $n_5=1.78590$ | $ν_5=44.1$ |
| | $r_{10}=$ −118.956 | | | |

-continued

| Lens | Radius of Curvature r | Lens Thickness or Distance d | Refractive Index n | Abbe No. $\nu$ |
|---|---|---|---|---|
| | | Aperture ratio 1 : 1.4 Angular field 75° F = 100 | | |
| | | $d_{10} = 0.000$ | | |
| $L_6$ | $r_{11} = -118.956$ | $d_{11} = 5.648$ | $n_6 = 1.80518$ | $\nu_6 = 25.4$ |
| | $r_{12} = 145.380$ | $d_{12} = 14.663$ | | |
| $L_7$ | $r_{13} = -285.050$ | $d_{13} = 4.209$ | $n_7 = 1.80518$ | $\nu_7 = 25.4$ |
| | $r_{14} = 209.766$ | $d_{14} = 29.606$ | $n_8 = 1.77250$ | $\nu_8 = 49.7$ |
| $L_8$ | $r_{15} = -105.195$ | $d_{15} = 0.351$ | | |
| $L_9$ | $r_{16} = 267.581$ | $d_{16} = 21.608$ | $n_9 = 1.83481$ | $\nu_9 = 42.8$ |
| | $r_{17} = -370.142$ | | | |

Back focal length = 133.794
$F_{1.2.3} = -130.240$   $F_{1.2.3.4.5} = -244.404$
$\Sigma d = 252.140$   $D = 92.325$   Sum of Petzval = 0.170 all distances are in millimeters, where
  $F$ : the resultant focal length of the entire system,
  $F_{1.2 \ldots i}$ : the resultant focal length to the $i$ group,
  $r_j$ : the radius of curvature of the $j$ surface, with the surfaces being numbered consecutively from the one nearest the object side,
  $d_j$ : the thickness or air gap between the $j$ and $j+1$ surfaces,
  $n_k$ : the refractive index of the $k$ lens,
  $\nu_k$ : the Abbe number of the $k$ lens,
  $\Sigma d$ : the overall length of the lens system,
  $D$ : the length from the first surface of the fourth group to the final surface of the fifth group.

3. A highly efficient wide angle photographic lens comprising seven lens groups positioned consecutively from the object to the image side of the lens system, said first group is a positive lens $L_1$, said second group is a negative meniscus lens $L_2$ convex to the object, said third group is a negative meniscus lens $L_3$ convex to the object, said fourth group is a positive lens $L_4$, said fifth group is a negative lens in the form of a compound lens comprising positive and negative lens elements $L_5$ and $L_6$, respectively, said sixth group is a positive lens and said seventh group is a positive lens, and a diaphragm being interposed between said fourth group and said fifth group, wherein said fifth group is a compound lens consisting of a positive lens and a negative lens not joined together, said sixth group is a compound lens consisting of a positive lens $L_7$ and a negative lens $L_8$ joined together, said seventh group is a simple lens $L_9$, the elements of said wide angle lens having the following characteristics and dimensions:

| Lens | Radius of Curvature r | Lens Thickness or Distance d | Refractive Index n | Abbe No. $\nu$ |
|---|---|---|---|---|
| | | Aperture ratio 1 : 1.4 Angular field 84° F = 100 | | |
| $L_1$ | $r_1 = 280.171$ | $d_1 = 26.408$ | $n_1 = 1.51874$ | $\nu_1 = 64.5$ |
| | $r_2 = 1566.384$ | $d_2 = 0.408$ | | |
| $L_2$ | $r_3 = 146.351$ | $d_3 = 9.184$ | $n_2 = 1.56873$ | $\nu_2 = 63.1$ |
| | $r_4 = 61.974$ | $d_4 = 30.776$ | | |
| $L_3$ | $r_5 = 210.804$ | $d_5 = 7.388$ | $n_3 = 1.54041$ | $\nu_3 = 51.0$ |
| | $r_6 = 72.030$ | $d_6 = 54.245$ | | |
| $L_4$ | $r_7 = 209.388$ | $d_7 = 57.102$ | $n_4 = 1.80518$ | $\nu_4 = 25.4$ |
| | $r_8 = -538.870$ | $d_8 = 13.225$ | | |
| $L_5$ | $r_9 = 2040.815$ | $d_9 = 45.347$ | $n_5 = 1.78590$ | $\nu_5 = 44.1$ |
| | $r_{10} = -159.042$ | $d_{10} = 0.694$ | | |
| $L_6$ | $r_{11} = -653.061$ | $d_{11} = 7.918$ | $n_6 = 1.84666$ | $\nu_6 = 23.9$ |
| | $r_{12} = 170.403$ | $d_{12} = 14.245$ | | |
| $L_7$ | $r_{13} = -648.583$ | $d_{13} = 3.796$ | $n_7 = 1.84666$ | $\nu_7 = 23.9$ |
| | $r_{14} = 159.277$ | $d_{14} = 37.061$ | $n_8 = 1.77250$ | $\nu_8 = 49.7$ |
| $L_8$ | $r_{15} = -157.998$ | $d_{15} = 0.408$ | | |
| $L_9$ | $r_{16} = 304.632$ | $d_{16} = 20.939$ | $n_9 = 1.83481$ | $\nu_9 = 42.8$ |
| | $r_{17} = -432.117$ | | | |

Back focal length = 151.051
$F_{1.2.3} = -118.329$   $F_{1.2.3.4.5} = -409.165$

-continued

| Lens | Aperture ratio 1 : 1.4 Angular field 84° F = 100 | | | |
|---|---|---|---|---|
| | Radius of Curvature r | Lens Thickness or Distance d | Refractive Index n | Abbe No. $\nu$ |

$\Sigma d = 309.144$  $D = 124.286$  Sum of Petzval $= 0.143$ all distances are in millimeters, where
- $F$ : the resultant focal length of the entire system,
- $F_{1\cdot 2 \ldots i}$ : the resultant focal length to the $i$ group,
- $r_j$ : the radius of curvature of the $j$ surface, with the surfaces being numbered consecutively from the one nearest the object side,
- $d_j$ : the thickness or air gap between the $j$ and $j+1$ surfaces,
- $n_k$ : the refractive index of the $k$ lens,
- $\nu_k$ : the Abbe number of the $k$ lens,
- $\Sigma d$ : the overall length of the lens system,
- $D$ : the length from the first surface of the fourth group to the final surface of the fifth group.

4. A highly efficient wide angle photographic lens comprising seven lens groups positioned consecutively from the object to the image side of the lens system, said first group is a positive lens $L_1$, said second group is a negative meniscus lens $L_2$ convex to the object, said third group is a negative meniscus lens $L_3$ convex to the object, said fourth group is a positive lens $L_4$, said fifth group is a negative lens in the form of a compound lens comprising positive and negative lens elements $L_5$ and $L_6$, respectively, said sixth group is a positive lens and said seventh group is a positive lens, and a diaphragm being interposed between said fourth group and said fifth group, wherein said fifth group is a compound lens consisting of a positive lens and a negative lens not joined together, said sixth group is a compound lens consisting of a positive lens $L_7$ and a negative lens $L_8$ joined together, said seventh lens is a simple lens $L_9$, and wherein a filter is positioned between said third and fourth groups the elements of said wide angle lens having the following characteristics and dimensions:

| Lens | | Aperture ratio 1 : 1.4 Angular field 84° F = 100 | | | |
|---|---|---|---|---|---|
| | | Radius of Curvature r | Lens Thickness or Distance d | Refractive Index n | Abbe No. $\nu$ |
| $L_1$ | $r_1 =$ | 277.551 | | | |
| | | | $d_1 = 27.225$ | $n_1 = 1.50378$ | $\nu_1 = 66.8$ |
| | $r_2 =$ | 1639.988 | | | |
| | | | $d_2 = 0.408$ | | |
| $L_2$ | $r_3 =$ | 134.694 | | | |
| | | | $d_3 = 9.225$ | $n_2 = 1.56873$ | $\nu_2 = 63.1$ |
| | $r_4 =$ | 63.474 | | | |
| | | | $d_4 = 31.592$ | | |
| $L_3$ | $r_5 =$ | 187.755 | | | |
| | | | $d_5 = 7.388$ | $n_3 = 1.51823$ | $\nu_3 = 59.0$ |
| | $r_6 =$ | 65.483 | | | |
| | | | $d_6 = 22.449$ | | |
| filter | | $\infty$ | | | |
| | | | 4.898 | 1.51633 | 64.1 |
| | | $\infty$ | | | |
| | | | 6.531 | | |
| $L_4$ | $r_7 =$ | 246.939 | | | |
| | | | $d_7 = 57.143$ | $n_4 = 1.80518$ | $\nu_4 = 25.4$ |
| | $r_8 =$ | −453.148 | | | |
| | | | $d_8 = 16.327$ | | |
| $L_5$ | $r_9 =$ | 1755.101 | | | |
| | | | $d_9 = 40.816$ | $n_5 = 1.78590$ | $\nu_5 = 44.1$ |
| | $r_{10} =$ | −131.478 | | | |
| | | | $d_{10} = 0.408$ | | |
| $L_6$ | $r_{11} =$ | −246.939 | | | |
| | | | $d_{11} = 7.878$ | $n_6 = 1.80518$ | $\nu_6 = 25.4$ |
| | $r_{12} =$ | 176.858 | | | |
| | | | $d_{12} = 14.041$ | | |
| $L_7$ | $r_{13} =$ | −649.130 | | | |
| | | | $d_{13} = 6.122$ | $n_7 = 1.80518$ | $\nu_7 = 25.4$ |
| | $r_{14} =$ | 163.265 | | | |
| $L_8$ | | | $d_{14} = 34.694$ | $n_8 = 1.77250$ | $\nu_8 = 49.7$ |
| | $r_{15} =$ | −147.092 | | | |
| | | | $d_{15} = 0.408$ | | |
| $L_9$ | $r_{16} =$ | 298.396 | | | |
| | | | $d_{16} = 20.408$ | $n_9 = 1.83481$ | $\nu_9 = 42.8$ |
| | $r_{17} =$ | −486.238 | | | |

Back focal length $= 150.855$
$F_{1\cdot 2\cdot 3} = -124.595$  $F_{1\cdot 2\cdot 3\cdot 4\cdot 5} = -304.599$
$\Sigma d = 307.961$  $D = 122.572$  Sum of Petzval $= 0.133$ all distances are in millimeters, where
- $F$ : the resultant focal length of the entire system,
- $F_{1\cdot 2 \ldots i}$ : the resultant focal length to the $i$ group,
- $r_j$ : the radius of curvature of the $j$ surface, with the surfaces being numbered consecutively from the one nearest the object side,
- $d_j$ : the thickness or air gap between the $j$ and $j+1$ surfaces,
- $n_k$ : the refractive index of the $k$ lens,
- $\nu_k$ : the Abbe number of the $k$ lens,
- $\Sigma d$ : the overall length of the lens system,
- $D$ : the length from the first surface of the fourth group to the final surface of the fifth group.

* * * * *